US012656443B2

(12) United States Patent　　　(10) Patent No.:　US 12,656,443 B2
　　Gerliz et al.　　　　　　　　　　(45) Date of Patent:　Jun. 16, 2026

(54) SENSOR APPARATUS FOR MOUNTING ON A VEHICLE WINDOW TO DETERMINE THE POSITION OF THE SUN

(71) Applicant: HELLA GmbH & Co. KGaA, Lippstadt (DE)

(72) Inventors: Viktor Gerliz, Bad Zwischenahn (DE); Eduard Desch, Hude-Wüsting (DE); Oliver Wilhelm, Stuhr (DE); Thomas Horn, Delmenhorst (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 640 days.

(21) Appl. No.: 18/312,607

(22) Filed: May 5, 2023

(65) Prior Publication Data

US 2024/0369669 A1　Nov. 7, 2024

(30) Foreign Application Priority Data

May 4, 2022　(DE) .......................... 102022110963.1

(51) Int. Cl.
G01S 3/783 (2006.01)
G01S 3/781 (2006.01)
(52) U.S. Cl.
CPC .............. G01S 3/783 (2013.01); G01S 3/781 (2013.01)
(58) Field of Classification Search
CPC ........ G01S 3/783; G01S 3/781; G01J 1/4228;
　　　　　　G01J 2001/4266; G02B 5/005; G02B
　　　　　　3/08; B60R 2011/0026; B60R 11/00;
　　　　　　G01C 1/00; G01C 15/00
See application file for complete search history.

(56) References Cited

U.S. PATENT DOCUMENTS 5,517,017 A * 5/1996 Yamada ................. G01C 21/02
　　　　　　　　　　　　　　　　　　　257/E31.115
5,553,661 A * 9/1996 Beyerlein .......... B60H 1/00735
　　　　　　　　　　　　　　　　　　　165/203
2006/0268262 A1 11/2006 Maldziunas

FOREIGN PATENT DOCUMENTS

DE　　102019121567 A1　2/2021
EP　　　　3144648 B1　9/2018

* cited by examiner

*Primary Examiner* — Francis Geroleo
(74) *Attorney, Agent, or Firm* — MUNCY, GEISSLER, OLDS & LOWE, P.C.

(57) ABSTRACT

A sensor apparatus for mounting on a motor vehicle window for determining the position of the sun includes at least one lens body and at least one detector with photosensitive regions, wherein the lens body has a radiation entry side and a radiation exit side which faces the detector. The sensor apparatus is wherein an opaque structure is arranged inside the lens body, at least four lens sections of the lens body are defined by the opaque structure, a photosensitive region of the detector is assigned to each lens section, and each lens section has at least one convex lens contour on the radiation exit side of the lens body.

12 Claims, 1 Drawing Sheet

SENSOR APPARATUS FOR MOUNTING ON A VEHICLE WINDOW TO DETERMINE THE POSITION OF THE SUN

FIELD OF DISCLOSURE

The invention relates to a sensor apparatus for mounting on a window of a vehicle to determine the position of the sun, wherein the sensor apparatus includes at least one lens body and one detector with photosensitive regions, wherein the lens body has a radiation entry side, and a radiation exit side which faces the detector. The invention further relates to a method for determining the position of the sun using a corresponding sensor apparatus.

BACKGROUND OF THE INVENTION

Sensor apparatuses for capturing the position of the sun in vehicles, particularly in motor vehicles, are known and may be installed in the dashboard, for example. Due to the technical requirements associated with determining the angle of incidence of the sun from a halfspace above the vehicle, the sensors are typically raised in the surface, in the form of a hemispherical protrusion, for example. Sensor assemblies of such kind can be used to determine the angle of incidence of the sun, and from this the position of the sun. This information can be used for example to control air conditioning systems or the like. However, the arrangement as raised dome-like structures on the dashboard is usually not considered acceptable any more, for design engineering reasons.

Moreover, sensor apparatuses are known for mounting on a vehicle window, on the windscreen, for example. Such as sensor apparatus is known for example from EP 3 144 648 B1.

SUMMARY OF THE INVENTION

The problem addressed by the invention is that of suggesting a sensor apparatus for determining the position of the sun, which may be mounted on the windscreen and still allows the position of the sun to be determined.

This problem is solved with a sensor apparatus having the features of claim 1 and a method having the features of claim 12.

In a sensor apparatus for mounting on a vehicle window for determining the position of the sun, wherein the sensor apparatus includes at least one lens body and at least one detector with photosensitive regions, wherein the lens body has a radiation entry side and a radiation exit side facing the detector, it is provided as essential to the invention that an opaque structure is arranged in the lens body, that at least four lens sections of the lens body are defined by the opaque structure, that a photosensitive region of the detector is assigned to each lens section, and that each lens section has a convex lens contour on the radiation exit side of the lens body.

The sensor apparatus has a lens body made from an opaque material, a plastic for example. The lens body has a radiation entry side which is designed to allow it to be arranged on the window, in particular on the windscreen of a vehicle. For this purpose, at least a portion of the lens body may be of flat construction on the radiation entry side. The lens body also has a radiation exit side, which is arranged facing the detector with the photosensitive regions. In particular, the radiation exit side is located opposite the radiation entry side. Solar radiation incident on the radiation entry side is guided through the lens body onto the detector with its photosensitive regions. An opaque structure is arranged inside the lens body, that is to say in the volume of the lens body. In particular, the opaque structure may be incorporated or embedded in the material of the lens body. The structure divides the lens body into at least four, in particular exactly four, lens sections. In this arrangement, the lens sections may be arranged next to each other in the form of quadrants. On the radiation exit side, that is to say on the side facing the photosensitive regions of the detector, the lens sections each have a convex contour, domed outwardly in the direction of the photosensitive regions. One photosensitive region of the detector is assigned to each convex lens contour, i.e. to each of the four lens sections, so that the detector in particular has exactly four photosensitive regions. The movement of the sun that takes place in the halfspace around the vehicle casts a shadow over the photosensitive regions by means of the opaque structure. This throws one or more lens sections into shadow. The light intensity in the respective lens section varies, and the signal change in the respective photosensitive region is registered by the detector. The intensities measured in all quadrants, that is to say in all photosensitive regions are always different at any time and for any position of the sun according to the position of the sun and the shadow cast by the opaque structure. Consequently, the value matrices of the respective photosensitive regions that depend on the position of the sun are also different. The position of the sun can be calculated very precisely from the four different intensity values with the aid of adapted algorithms.

In a further development of the invention, the radiation entry side of the lens body facing the window of the vehicle has a substantially flat structure. The flat construction of the radiation entry side or the flat construction of at least a portion thereof enables the lens body to lie flat against the windscreen of the vehicle, wherein further connecting layers may be arranged between the lens body and the window. The sunlight falling on the window of the vehicle may thus be guided through the lens body onto the photosensitive regions.

In a further development of the invention, the opaque structure is constructed in the form of a cross with four cross arms, and a translucent lens section of the lens body constructed in the form of a quadrant is arranged between each two adjacent cross arms of the cruciform opaque structure. The opaque structure is cruciform, wherein a notional plane defined by the four cross arms is aligned substantially parallel to the window when the apparatus is mounted on the window. In particular, the four cross arms are of identical length, and two adjacent cross arms form an angle of 90°. A lens section is formed between each two adjacent cross arms. The four lens sections, that is to say the quadrants, are each assigned to a photosensitive region of the detector. In this context, the photosensitive regions are in particular arranged in a 2×2 grid. The cruciform structure thus causes shadowing of the incident sunlight, and these shadows may be detected by the photosensitive regions independently of each other.

In a further development of the invention, at least portions of the cross arms of the cruciform structure are wedge-shaped. The cruciform structure thus resembles a frustum. In this configuration, the base areas of the cross arms preferably lie in a common plane. The wedge faces of the cross arms each extend at and angle to this common plane and each forms an acute angle of for example less than or equal to 5° with the plane. A square surface, which may also be viewed as the top face of a frustum, may be situated between the edges of the converging wedge faces. Alternatively, portions of the cross arms may also be cuboid in shape, and the wedge-shaped portions may be located on the cuboid portions. In particular, the cuboid portions may have a large longitudinal extension compared with the other edges and the height thereof is smaller than their width. The cross arms may each have a rectangular end face, which originates from the cuboid portion. The sloping wedge faces each form an acute angle with the rectangular portions.

In one embodiment of the invention, the vertices of the acute angles formed between the edge faces are located on the outer ends of the cross arms on the outer sides of the structure. An acute angle is formed between the two wedge faces of a wedge-shaped cross arm. The vertex of this acute angle faces away from the middle of the cross, that is to say on the outside of the structure, in other words on the outer sides of the cross arms. From the middle of the cruciform structure, the cross arms slope down towards the outer ends of the cross arms on the side facing the radiation entry side. Thus, the cruciform structure has a greater thickness in its middle than at the ends of the cross arms.

In one embodiment of the invention, a notional ground plane is defined by the cross arms of the structure, and at least a portion of a frustum is defined by the ground plane and the wedge faces of the cross arms extending at an angle to the ground plane. At least a portion of a notional frustum may be defined by the surfaces of the at least partially wedge-shaped cross arms and a top face situated between the slanting wedge faces. In particular, the frustum is defined by the intersections of the notional planes defined by the individual wedge faces.

In one embodiment of the invention, a top face of the frustum opposite the ground plane of the frustum is arranged to face the window when mounting on a window, and the ground plane of the frustum is arranged to face the detector. The wedge faces extending at an angle to the ground plane of the frustum are arranged to face the radiation entry side of the lens body. The surfaces of the cross arms situated in the same plane are arranged to face the detector. Due to the arrangement of the slanting surfaces of the cross arms, different shadowing is cast over the photosensitive regions at any time and for any position of the sun, thereby making it possible to calculate the position of the sun precisely.

In one embodiment of the invention, surfaces of the cross arms that are arranged parallel to the ground plane defined by the cross arms are arranged to face the detector, and the wedge faces arranged at an angle to the ground plane defined by the cross arms are arranged to face the radiation entry side of the lens body. The wedge faces arranged at an angle to the notional ground plane defined by the cross arms cause a shadow to be cast over the photosensitive regions. In this way, the position of the sun may be calculated from the light intensities detected at the four photosensitive regions.

In a further development of the invention, at least a portion of the radiation entry side of the lens body has a structured surface. With the structuring of the surface, it is possible to capture a sufficiently large aperture angle. Structuring of such kind may be for example eroded structures, corrugated, finely structured, geometrically structured, sawtooth structured, lasers-structured and similar structures. For example, eroding produces a diffuse light passage behaviour. The raised structure of the eroded surface also makes it possible to achieve shallow light entry angles.

In one embodiment of the invention, in the mounted state the detector with its photosensitive regions is arranged between the cross arms of the cruciform structure on the side of the lens body facing away from the window. For example, in a top view the regions between two adjacent cross arms and the photosensitive regions of the detector overlap. In this way, the sunlight is able to reach the photosensitive regions between the cross arms, or the wedge-shaped cross arms may cast shadows over the photosensitive regions, thereby enabling the position of the sun to be calculated.

In one embodiment of the invention, the convex lens contours on the side of the lens body facing the detector are domed outwards in the direction of the respective photosensitive region. In order to focus the sunlight which is guided through the lens body onto the respective photosensitive regions, the lens body has four convex, that is to say outwardly domed lens contours, which are assigned to the respective photosensitive regions. The lens contours of the lens body may thus be arranged in a 2×2 grid.

A further aspect of the invention relates to a vehicle with a window and a sensor apparatus according to the invention arranged on the window. With a sensor apparatus according to the invention, which is preferably arranged on the windscreen of the vehicle, the position of the sun may be calculated precisely as the sun moves in the halfspace around the vehicle.

A further aspect of the invention relates to a method for determining the position of the sun, in particular with a sensor apparatus according to the invention, with a cruciform, opaque structure having four cross arms, wherein four translucent quadrants are formed between the cross arms, wherein at least one photosensitive region is assigned to each quadrant, wherein the light intensity of the sunlight incident on four photosensitive regions and thus also a shadow cast on the quadrants by the cross arms is captured by the four photosensitive regions independently of each other, and that the position of the sun is calculated from the four captured light intensity values. The movement of the sun taking place in the halfspace around the vehicle and/or the change of the vehicle's position relative to the sun combined with the partially pyramidal, cruciform, opaque structure causes a change in the shadowing cast over the translucent quadrants. In this way, one or more photosensitive regions assigned to the quadrants are placed in shadow. The light intensity in the respective quadrant varies, and the signal change is registered with the aid of the photosensitive regions. An angle-dependent light passage behaviour in respect of the photosensitive regions is created. The measured light intensity values are always different in all quadrants at any time and for any position of the sun depending on the sun's position and the shadow cast by the opaque structure. Consequently, the value matrices of the respective photosensitive regions that are determined by the sun's position also differ, thus enabling a position of the sun to be calculated from the four different light intensity values.

In one embodiment of the method, the azimuth and elevation of the sun's position are calculated. The calculation of azimuth and elevation enables an exact statement to be made about the position of the sun in relation to the vehicle.

In one embodiment of the method, the position of the sun is determined from the four measured light intensity values using by means of an algorithm. The position of the sun may be determined from the measured light intensity values based on the continuously varying shadow cast over the four different photosensitive regions by the opaque structure using an algorithm, which may be run for example on a calculation engine, an arithmetic unit or the like.

In one embodiment of the invention, the position of the sun is determined from the four measured light intensity values by means of trigonometric angle functions. Alternatively, it is also possible to determine the position of the sun purely analytically from the measured light intensity values using the trigonometric angle functions. In this case, the movement of the shadow cast by the opaque structure is determined by the sun. All of the data needed to make the calculation is known from the geometric relationships in the pyramid-like structure, for example the inclination of the wedge faces. The purely analytical solution of the progression of the shadow enables a considerable saving of memory resources as well as the computing power needed.

BRIEF DESCRIPTION OF THE DRAWINGS

In the following text, the invention will be explained further with reference to an embodiment represented in the drawing. Specifically, the schematic illustrations show in.

DETAILED DESCRIPTION

Figures 1, 2, 3:
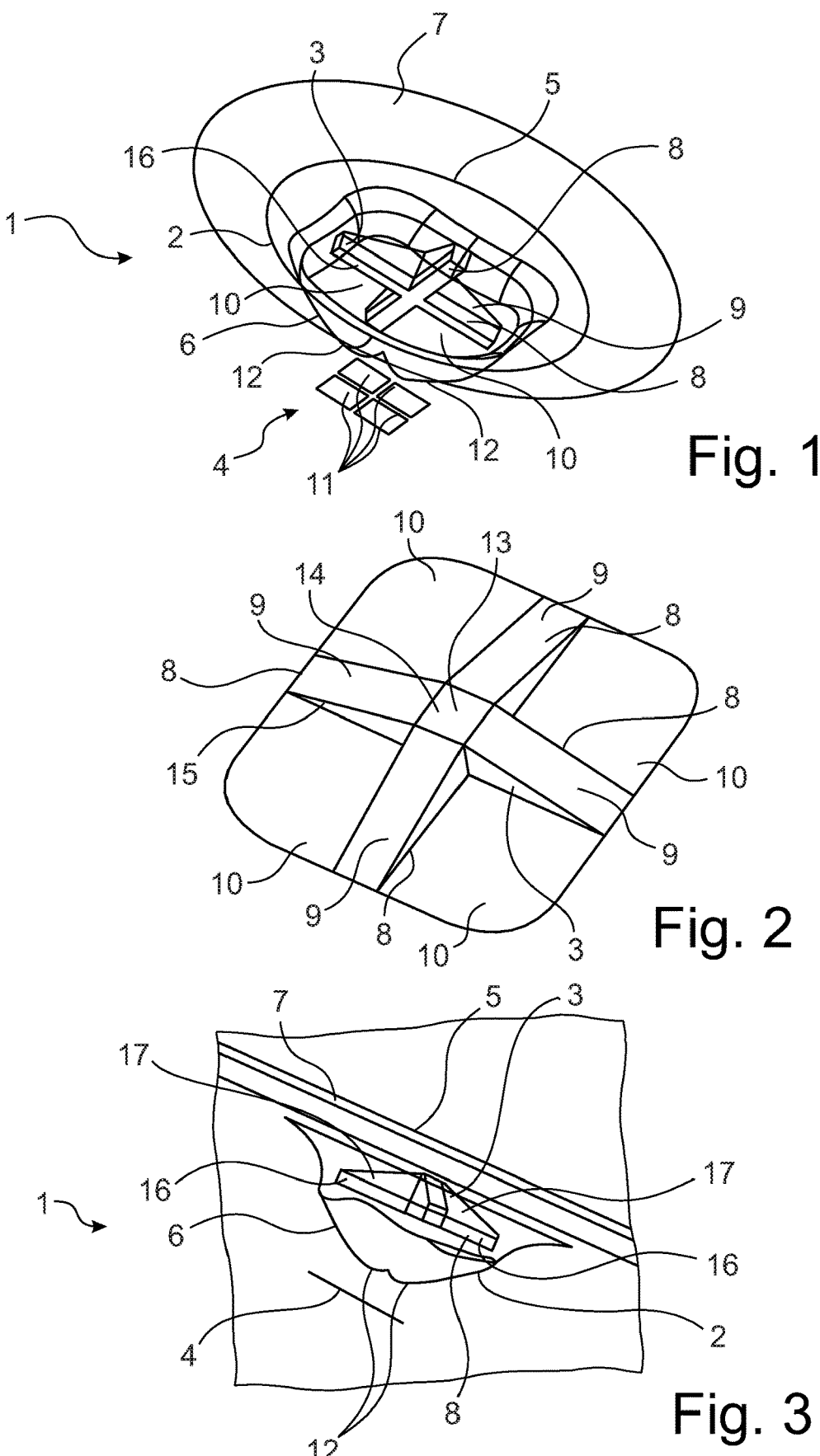
FIG. 1: a sensor apparatus with a lens body, an opaque structure and a detector.
FIG. 2: an opaque element.
FIG. 3: a sensor apparatus according to FIG. 1 mounted on a window.

FIG. 1 shows a sensor apparatus 1 with a lens body 2, an opaque structure 3 arranged inside the lens body 2, and a detector 4. The lens body 2 has a radiation entry side 5 and a radiation exit side 6. The radiation entry side 5 of the lens body 2 has a substantially flat construction and is intended for lying flush against a window 7 of a vehicle. An opaque structure 3 is arranged inside the lens body 2. In particular, the opaque structure 3 may be arranged in the volume of the lens body 2. The opaque structure 3 is of substantially cruciform construction and has four cross arms 8. Portions of the cross arms 8 are wedge-shaped. The cross arms 8 each have a cuboid portion 16, on which the wedge-shaped portion 17 is situated. A notional plane is defined by the cross arms 8, in particular by the cuboid portion 16 of the cross arms 8. The surfaces of the cross arms 8 that face the detector 4 lie in this notional plane. The wedge faces 9 of the cross arms 8, which are arranged to face the radiation entry side 5 are at an angle to this notional plane. Lens sections 10 in the form of quadrants are formed between each two adjacent cross arms 8. A photosensitive region 11 of the detector 4 is assigned to each lens section 10. The photosensitive regions 11 are arranged in a 2×2 grid. Each of the lens sections 10 has a convex lens structure 12 domed outwards in the direction of the photosensitive regions 11 on the radiation exit side 6. The sunlight that enters the lens body 2 through the radiation entry side 5 is directed onto the respective photosensitive regions 11 through the convex lens structures 12.

FIG. 2 shows a cruciform opaque structure 3 according to FIG. 1. A lens section 10, to which a photosensitive region 11 of a detector 4 is assigned, is arranged between each two adjacent cross arms 8. A portion of the cross arms 8 is wedge-shaped, wherein a notional plane in which a surface of the cross arms is situated is defined by the cross arms 8. The wedge faces 9 extend at an angle to the defined notional plane. From the middle 13 of the structure 3, the wedge faces 9 slope outwards towards the notional plane. Acute angles 15 are formed between the notional defined plane and each of the wedge faces 9. The wedge faces 9 adjoin a top face 14 situated in the middle 13 of the structure 3. A frustum may be partially defined by the top face 14 and the wedge faces 9.

FIG. 3 shows a sensor apparatus 1 according to FIG. 1. The converging wedge faces 9 are arranged to face the window 7. The convex lens structures 12 on the radiation exit side 6 are arranged to face the detector 4. The light that enters through the window 7 and is guided through the lens body 2 is directed onto the photosensitive regions 11 of the detector 4.

The invention claimed is:

1. A sensor apparatus for mounting on a vehicle window for determining the position of the sun, wherein the sensor apparatus has at least one lens body and at least one detector with photosensitive regions, wherein the lens body has a radiation entry side and a radiation exit side facing the detector, wherein an opaque structure is arranged inside the lens body, at least four lens sections of the lens body are defined by the opaque structure, a photosensitive region of the detector is assigned to each lens section, and each lens section has at least one convex lens contour on the radiation exit side of the lens body, wherein the opaque structure is constructed in the form of a cross with four cross arms, that a lens section of the lens body in the form of a quadrant is formed between each two adjacent cross arms of the cruciform opaque structure, wherein at least portions of the cross arms of the cruciform structure are wedge-shaped, wherein the vertices of the acute angles defined between the wedge faces are situated on the outer sides of the structure at the outer ends of the cross arms.

2. The sensor apparatus according to claim 1, wherein the lens body is of substantially flat construction on the radiation entry side facing the window of the vehicle.

3. The sensor apparatus according to claim 1, wherein a notional ground plane is defined by the cross arms of the structure, and a frustum is at least partially defined by the ground plane and wedge faces of the cross arms arranged at an angle to the ground plane.

4. The sensor apparatus according to claim 1, wherein the surfaces of the cross arms arranged parallel to the ground plane defined by the cross arms are arranged to face the detector, and the wedge faces arranged at an angle to the notional ground plane defined by the cross arms are arranged to face the radiation entry side of the lens body.

5. The sensor apparatus according to claim 1, wherein at least a portion of the radiation entry side of the lens body has a structured surface.

6. The sensor apparatus according to claim 1, wherein in the mounted state the photosensitive regions of the detector are arranged between the cross arms of the cruciform structure on the side of the lens body facing away from the window.

7. The sensor apparatus according to claim 1, wherein the convex lens contours are domed outwardly in the direction of the respective photosensitive regions on the side of the lens body facing the detector.

8. A vehicle with a window and a sensor apparatus according to claim 1 arranged on the window.

9. A method for determining the position of the sun, in particular with a sensor apparatus according to claim 1, with a cruciform opaque structure having four cross arms, wherein four translucent quadrants are formed between the cross arms, wherein at least one photosensitive region is assigned to each quadrant, wherein the light intensity of the light incident on four photosensitive regions and thus also a shadow cast by the cross arms onto the quadrants is captured by the four photosensitive regions independently of each other, and the relative position of the sun to the vehicle is calculated from the four captured light intensity values.

10. The method according to claim 9, wherein azimuth and elevation of the sun's position are calculated.

11. The method according to claim 9, wherein the position of the sun is determined from the four measured light intensity values by means of an algorithm.

12. The method according to claim 9, wherein the position of the sun is determined from the four measured light intensity values by means of trigonometric angle functions.

* * * * *